UNITED STATES PATENT OFFICE.

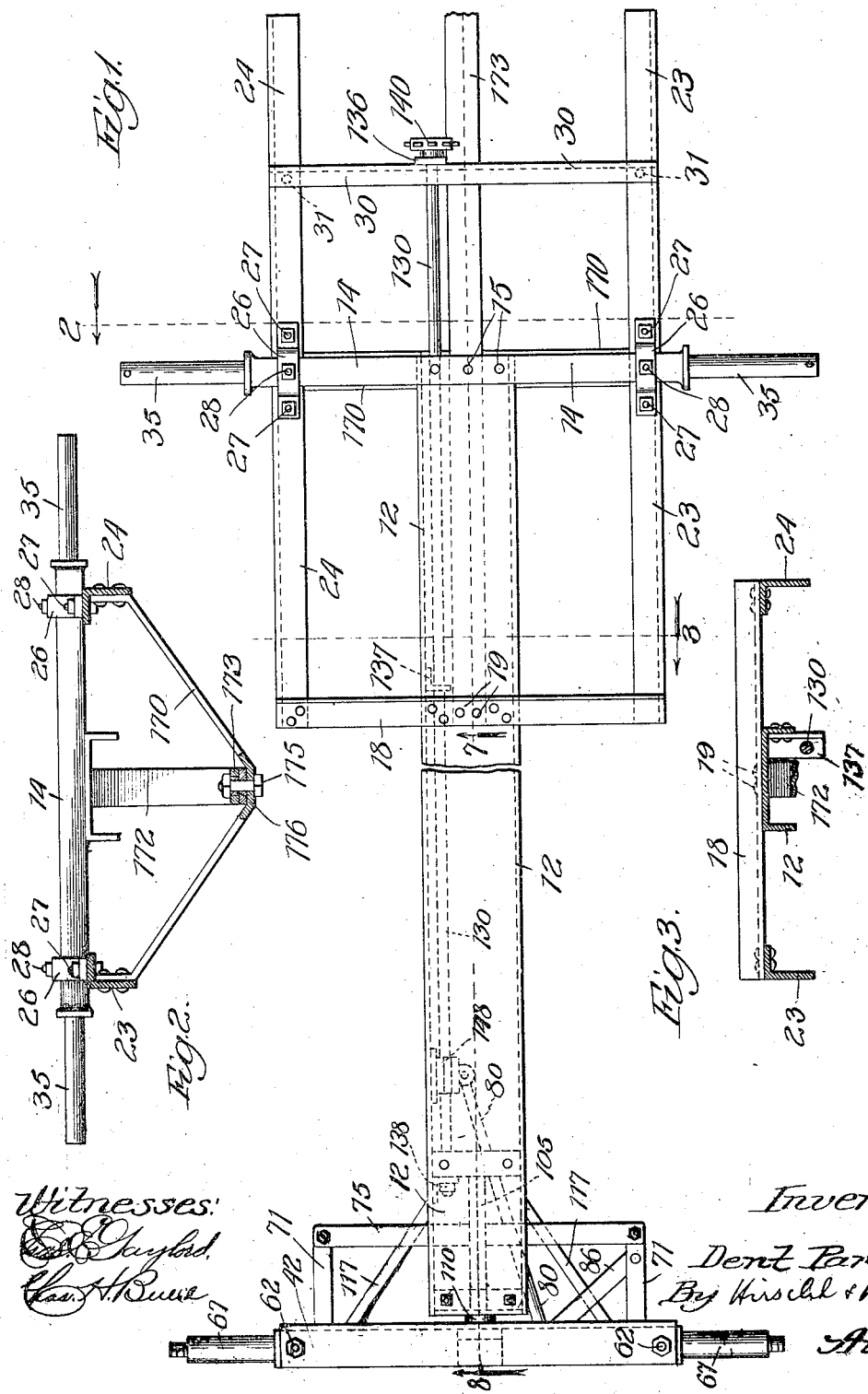

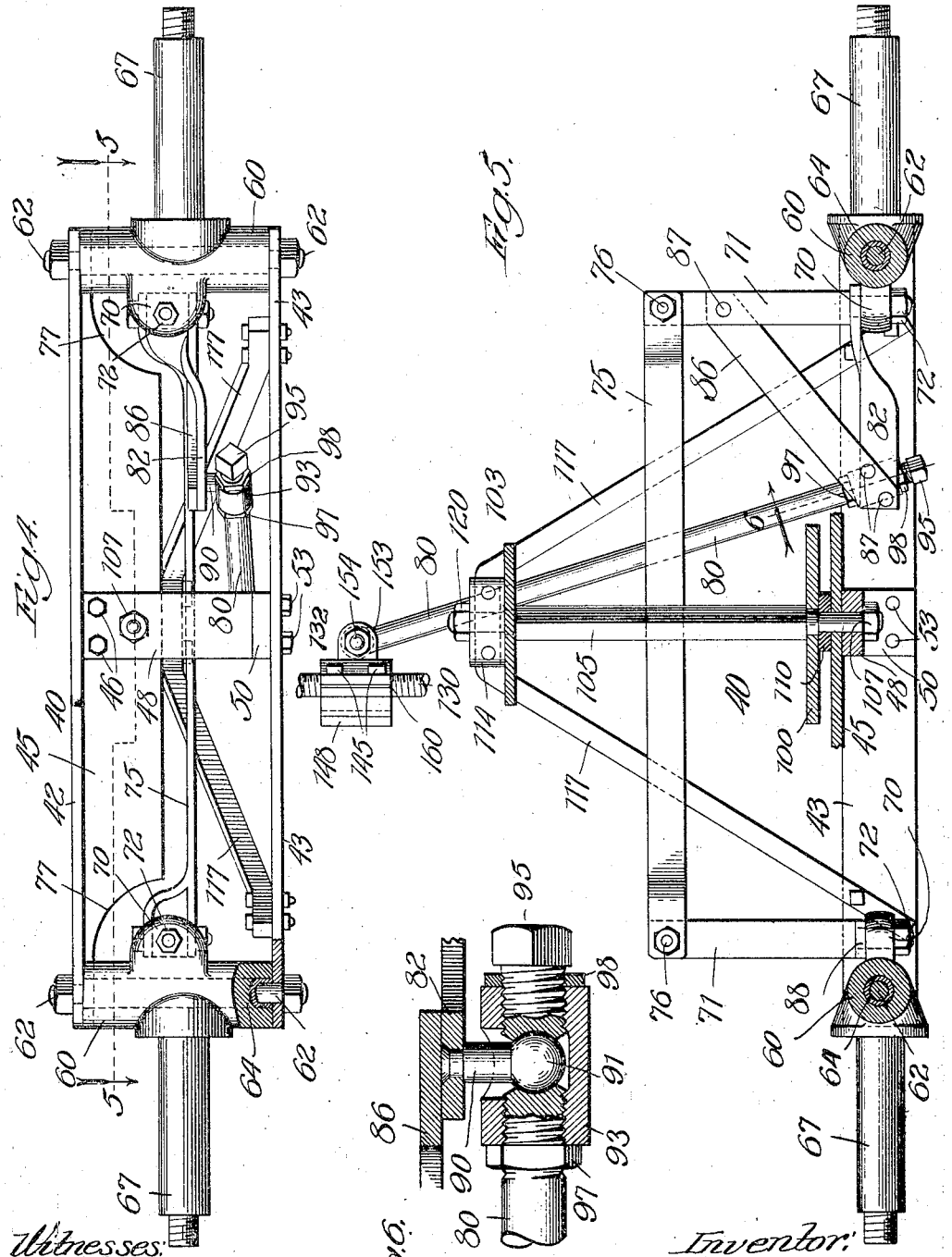

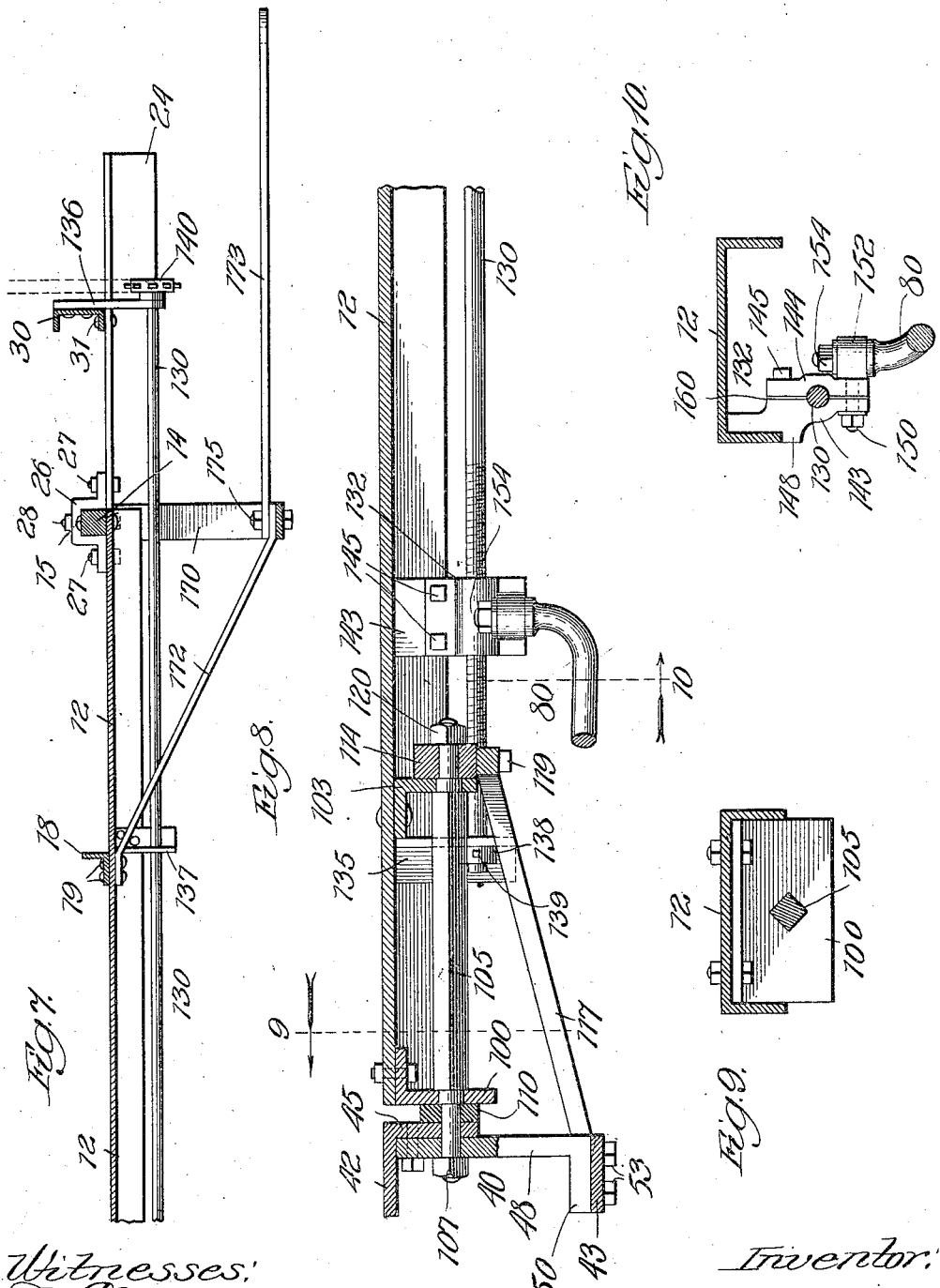

DENT PARRETT, OF WENONA, ILLINOIS, ASSIGNOR TO PARRETT TRACTOR COMPANY, A CORPORATION OF ILLINOIS.

TRACTOR.

1,149,403.  Specification of Letters Patent.   Patented Aug. 10, 1915.

Application filed December 11, 1912. Serial No. 736,169.

*To all whom it may concern:*

Be it known that I, DENT PARRETT, a citizen of the United States, residing in the town of Wenona, Marshall county, Illinois, have invented new and useful Improvements in Tractors, of which the following is a specification.

This invention relates to improvements in traction engines, or tractors, and more especially to certain details of construction of the frame, axles and steering gear of such machines.

Some of the requirements of a practical tractor are that it be capable of drawing heavy loads over rough and uneven ground, and through mud and up hills; and its frame and axles should therefore be sufficiently strong and rigid to support the heavy machinery required for such purpose, and to take the other strains involved in hauling and drawing heavy loads; while at the same time they must be sufficiently flexible to yield without distortion when the device is operating over uneven ground and one wheel is out of the plane of the other three. The steering gear must also be sufficiently strong to withstand the rough usage required, and should be simple in construction in order to be easily adjusted by persons unskilled in mechanics and easily repaired or replaced in case of damage caused by running into obstructions, or other accident; which is not infrequent in the kind of service required.

A tractor frame with axles and steering gear embodying the principles of the present invention is illustrated in the accompanying drawings in which:

Figure 1 is a top plan view. Fig. 2 is a transverse vertical section on the line 2 of Fig. 1. Fig. 3 is a transverse vertical section on the line 3 of Fig. 1. Fig. 4 is a view in front elevation. Fig. 5 is a horizontal section on the line 5 of Fig. 4. Fig. 6 is a vertical section on the diagonal line 6 of Fig. 5. Figs. 7 and 8 are longitudinal vertical sections on the lines 7 and 8 respectively of Fig. 1. Figs. 9 and 10 are transverse vertical sections on the lines 9 and 10 respectively of Fig. 8.

As shown in said drawings, the main frame member is formed of a longitudinally arranged, inverted channel member 12 which is of substantially the length of the wheel base of the machine. The rear end of such frame member is supported by the solid stationary rear axle 14 which is shown as square in cross section and having the rear end of the inverted channel member 12 secured to its center by means of rivets 15.

Forward of the axle 14 and parallel therewith is a cross member or transverse frame member 18, of angle section, resting on top of the channel member 12 and likewise riveted thereto, as indicated at 19, 19; and to each end of the transverse member 18 are similarly secured the forward ends of side frame members 23, 24, which extend rearwardly in a direction parallel with the member 12 and in a horizontal plane immediately below the plane of the cross member 18 and the axle 14; the two side members 23 and 24 being riveted to the underside of the cross member 18 and being hung from the axle by means of shackles or clips 26, 26. The latter are bolted to the horizontal flanges of the angular side members 23 and 24 by means of bolts 27 and embrace the axle; and in order to additionally secure the parts a bolt 28 passes through the top of each clip 26 and through the axle and frame member beneath it; the two bolts 28 being secured by nuts as shown. The two side frame members 23 and 24 extend rearwardly beyond the axle 14 and near their rear ends is placed a second transverse frame member 30, of channel section, arranged with its web part in a vertical plane, and secured to the two side members by rivets 31 through its bottom flange. It will be seen therefore that the two side members 23 and 24 and the transverse members 18 and 30 form a retangular frame resting on the axle 14 and strengthened by the central longitudinal member 12, for supporting the propelling machinery and other parts of the tractor. The ends of the axle 14 are made cylindric, as shown at 35, for receiving the driving wheels of the apparatus; and the latter may be of any desired or approved form and may be driven by gears or chains or in any suitable manner from the propelling machinery carried on the frame.

The front axle with its associated parts, indicated as a whole by 40, is swiveled or pivoted to the front end of the channel member 12 in a manner permitting of its limited rotation in a vertical plane about an axis which passes through its center. It is formed of upper and lower transverse members 42 and 43 respectively, the former of angle section, having a horizontal flange, and a depending vertical flange 45, and the latter comprising a flat plate or bar arranged below the member 42 and in the same transverse vertical plane.

The two transverse members 42 and 43 are joined at their center by a strut or spacing member 48 which has its upper end bolted to the vertical flange 45, as indicated at 46, and its lower end made with an integral horizontal flange 50 bolted upon the upper side of the cross bar 43, as indicated at 53.

Between the ends of the parallel axle members 42 and 43 are placed vertical steering knuckles supporting front wheel spindles, and these parts are constructed as follows: Each steering knuckle includes a vertically arranged cylindric part 60 which is pivoted between the ends of the axle members by means of a large steering bolt 62 passing through its center and through holes in the ends of the axle members and secured in place by nuts on its ends; and for the purpose of spacing apart the two axle members 42 and 43 the openings through the cylindric members 60 are made large enough to accommodate tubes or bushings 64 which take the pressure of the nuts on the ends of the steering bolts and allow the steering knuckles to turn freely. Each steering knuckle comprises, in addition to the cylindric part 60, an integral horizontal wheel spindle 67 for one of the front wheels, and in the same axial plane but diametrically opposite to the wheel spindle is formed a rib or boss 70 for the attachment of a steering arm 71. The latter comprises a short rod reduced in diameter to extend through a hole through the rib 70, with its projecting end threaded and secured by a nut 72. The two steering arms 71 extend rearwardly, each at right angles to the direction of its associated spindle 67, and their rear ends are connected by a horizontal drag link 75 which is yoked at each end and pivoted to the ends of the steering arms by means of bolts 76 as shown; and in order to accommodate these parts the flange 45 is cut away at each end of the axle member 42, as indicated at 77, 77.

It should be noted that when the two wheel spindles 67 are in axial alinement as shown in Fig. 5, and the front wheels therefore parallel, the two steering arms 71 are also parallel; but by reason of the offsetting of such steering arms from the axes of the cylindric parts 60, lines drawn through such axes and through the adjacent pivot points 76 (which lines determine the effective angles between the steering arms and the wheel spindles) will converge toward the rear axle as is required in order to make the front wheels turn at different angles when the machine is turned.

It will be seen therefore that the steering arms 71 are very simple in construction, each one being straight, and their proper setting is at right angles to the wheel spindles 67, with the result that in case of damage to one of the steering arms, which may be caused by running into obstructions as is not unusual, it may be easily straightened, if bent, or otherwise repaired or replaced; and the complete steering knuckles may be easily removed by withdrawing the steering bolts 62.

The device is steered through a horizontal steering rod 80 which is connected at its forward end through a ball and socket joint to an arm 82 extending from one of the steering knuckles 60. Such arm comprises a flat bar attached to the rib 70 of such knuckle, the bar having an opening through its end and being bolted to the rib by means of the steering arm 71 which passes through it and secures it rigidly in place. The bar is twisted so that its opposite end lies in a horizontal plane, and a diagonal brace 86 extends from such end to the arm 71; being secured at each end by rivets 87, 87. In order that the two steering arms 71 may be made alike a spacing washer 88, of the same thickness as the bar 82, is placed between the steering arm 71 and the rib 70 at the opposite end of the axle. In the end of the arm 82 and extending downward is fixed a short stud or projection 90 having its lower end 91 spherical and enlarged and entering an opening in the top of a short threaded tube 93 secured over the threaded end of the steering rod 80. The end of such rod is spherically recessed to engage with the ball 91 and into the opposite end of the tube 93 is threaded a screw 95 with its end similarly formed to engage with the other side of the ball. The proper setting of these parts is maintained by means of set nuts 97 and 98.

The front axle is pivotally attached at its center to the forward end of the frame member 12 in a manner permitting of its limited rotation in a transverse vertical plane. For this purpose a depending bracket 100 is arranged at the forward end of the frame member 12, such bracket comprising a short length of angle iron or angle steel bolted to the under side of the frame member; and to the rear of it is riveted a similar bracket 103. Openings are made through these in which is journaled a bar or shaft 105 having its ends turned cylindric for such purpose. The cylindric part of the forward end of the bar 105 which extends beyond the bracket 100 is reduced in diameter and extended through openings in the axle members 42 and 48, with its projecting end threaded and rigidly secured by means of a large nut 107. A spacing washer or ring 110 is interposed between the axle part 42 and the bracket 100 and transmits the pressure of the nut 107 to the shoulder formed between the larger and smaller cylindric parts of the bar 105 to prevent binding. The rear end of the bar or shaft 105 is similarly formed and journaled in an opening through the bracket 103. Its projecting end is likewise reduced in diameter and extends through a large block 114 to which is attached the apex of a V-shaped frame for bracing the front axle. Such frame comprises two integral arms 117, 117, with their common part secured to the underside of the block 114 by means of cap screws 119, and their forward ends bolted to the outer ends of the axle member 43 as shown. The block 114 is similarly secured on the end of the pivot shaft 105 by means of a nut 120, as shown, and similarly bears against a shoulder where the larger cylindric part of the shaft turns in the bracket 103. By this means it will be seen that the axle parts 42, 43 and 48, the pivot shaft 105, the spacing members 110 and 114, and the diagonal braces 117 are secured rigidly together as a unit and may rotate about the axis of the pivot shaft in the openings through the stationary bracket members 100 and 103.

The steering rod 80 is actuated for the purpose of steering the device through a long, horizontal, threaded shaft or screw 130 working in a nut 132 to which is pivotally attached the rear end of such steering rod. The front end of the threaded shaft or screw shaft 130 is journaled in a depending bracket 135 which is riveted to one of the vertical flanges of the channel member 12, and its rear end is journaled in a plate 136 which depends from the transverse frame member 30. An intermediate bracket 137, similar to the bracket 135, furnishes additional support. A collar 138, secured by a set screw 139, is fixed to the forward end of the screw shaft and a sprocket wheel 140 to its rear end; the latter being for engagement by a sprocket chain connecting with a hand wheel or other suitable steering arrangement for rotating the shaft 130. The nut 132 is made in two parts 143, 144, separated in an axial plane and secured together by cap screws 145; and the part 143 is made with a wide flat side sliding against the under side of the channel member 12, with another flat side sliding against the inner side of the adjacent depending flange of such channel member, and with a laterally extended part or ledge 148 engaging the under edge of such flange, to keep the nut from rotating. An eye bolt 150 also extends through the two parts of the split nut to aid in securing them together and forms a horizontal pivot for the rear end of the steering rod 80; the latter being upturned, and its vertical part extending through the eye and being secured by a nut 154 on its threaded projecting end. It will be seen therefore that the means of attachment of the steering rod 80 to the steering nut 132 constitutes a universal joint permitting the steering rod to move up and down and sidewise as is required for the turning of the front wheels and the swiveling of the front axle, and by reason of the fact that the screw 130 and the front axle pivot 105 are nearly in axial alinement the steering is not substantially affected by such relative movement of the front axle with respect to the frame of the device. Shims 160 may be placed between the two parts of the split nut 132, and afterward removed as desired to compensate for wear.

The draw bar construction comprises a bar 170 which is bent to form a V and looped downward from the two frame members 23 and 24 to which its upper ends are riveted immediately below the axle 14. It is joined at its lowest part by a diagonal brace 172 which is secured to the underside of the frame member 12 at the point where it is intersected by the transverse member 18. A horizontal draw bar 173 with an eye in its rear end is attached to these parts at its front end, being pivoted upon a pivot bolt 175 which secures the parts 170 and 172 together and has a bushing 176 surrounding its upper part in order that its nut may be tightened and still permit the draw bar to swing freely.

I claim as my invention:

1. In a tractor, the combination of a longitudinal frame member, a front axle supporting its forward end, steering knuckles at the ends of such axle, steering arms and a drag link connecting such steering knuckles, and a steering rod and a screw and nut for moving such steering rod, such screw being arranged parallel to such longitudinal frame member and such nut engaging with such longitudinal frame member to prevent rotation.

2. In a tractor, the combination of a longitudinal frame member, a rear axle supporting its rear end and a front axle pivoted to its front end, such front axle comprising parallel upper and lower members, a central spacing member, a shaft with its end supported in such central member, and diagonal braces to the opposite end of such shaft, such longitudinal frame member having brackets in which such shaft is journaled.

3. In a tractor, the combination of a longitudinal frame member and a front axle pivoted to its front end, such front axle comprising parallel upper and lower members one of them having a vertical flange with an opening therethrough, a central spacing member with a corresponding opening, a pivot shaft with its end fixed in such openings, and diagonal braces from the other axle member to the opposite end of such pivot shaft, said longitudinal frame member having brackets in which said pivot shaft is journaled.

4. In a tractor, the combination of a longitudinal frame member having depending brackets at its forward end, a front axle supporting a pivot shaft journaled in such brackets, steering knuckles at the ends of such axle, steering arms and a drag link connecting such steering knuckles, and a steering rod and a screw and nut for moving such steering rod, such screw being supported below and parallel to such longitudinal frame member and nearly in axial alinement with such axle pivot shaft.

5. In a tractor, a longitudinal frame member of inverted channel section, brackets depending therefrom, a screw journaled in such brackets, a nut engaging such screw, such nut having a flat surface sliding against the surface of said channel member, and a steering rod with its end pivotally attached to said nut.

6. The combination in a tractor, of a front axle comprising parallel upper and lower axle members and a steering knuckle at each end of said axle, each steering knuckle comprising a cylindric part placed between the two axle members, a steering bolt extending through such cylindric part and through said axle members, a wheel spindle part, an opening through such rib, and a steering arm fixed into such opening.

7. The combination in a tractor, of a front axle comprising parallel upper and lower axle members and a steering knuckle at one end of said axle, said steering knuckle comprising a cylindric part placed between the two axle members, a steering bolt extending through such cylindric part and through said axle members, a wheel spindle and a rib extending from said cylindric part, an opening through such rib, a steering arm fixed into such opening, another arm fixed to such rib and a diagonal brace between said two arms.

8. In a tractor, an axle comprising parallel upper and lower members with vertically pivoted steering knuckles at the ends of such axle, each knuckle comprising a cylinder arranged between such parallel axle members, an axial opening through such cylinder, a bushing in such opening, a bolt extending through such bushing and through the ends of the axle members, a wheel spindle secured to such cylinder, a rib on such cylinder, and a steering arm secured to such rib and extending at right angles to such wheel spindle, such steering arm being off-set with respect to the axis of such cylinder.

In witness whereof, I have hereunto subscribed my name in the presence of two witnesses this 7 day of December, 1912.

DENT PARRETT.

Witnesses:
EMIL R. ROSENTHAL,
JENNIE MILLER.